United States Patent [19]

Heck et al.

[11] Patent Number: 4,911,879

[45] Date of Patent: Mar. 27, 1990

[54] APPARATUS FOR THE RECOMBINATION OF HYDROGEN AND OXYGEN

[75] Inventors: Reinhard Heck, Hanau; Willi Siegler, Offenbach; Klaus-Dieter Werner, Dreieich, all of Fed. Rep. of Germany

[73] Assignee: Siemens Aktiengesellschaft, Munich, Fed. Rep. of Germany

[21] Appl. No.: 232,316

[22] Filed: Aug. 15, 1988

[30] Foreign Application Priority Data

Aug. 14, 1987 [DE] Fed. Rep. of Germany ....... 3727207
May 10, 1988 [DE] Fed. Rep. of Germany ....... 3816012

[51] Int. Cl.$^4$ ............................................. G21C 9/04
[52] U.S. Cl. .................................... 376/301; 423/580
[58] Field of Search ................. 376/301, 300; 423/580

[56] References Cited

U.S. PATENT DOCUMENTS 3,660,041 5/1972 Moore et al. ........................ 376/301
4,119,706 10/1978 Rogers ................................. 376/301
4,741,879 5/1988 McLean et al. ..................... 376/301

FOREIGN PATENT DOCUMENTS 3035103 3/1982 Fed. Rep. of Germany ...... 376/300
3004677 5/1988 Fed. Rep. of Germany .

Primary Examiner—Daniel Wasil
Attorney, Agent, or Firm—Herbert L. Lerner; Laurence A. Greenberg

[57] ABSTRACT

An apparatus for the recombination of hydrogen and oxygen with the aid of a catalyst includes a vertically extending tube having end surfaces. A catalyst body is disposed in the tube. Stoppers close the end surfaces of the tube and open as a function of at least one parameter from the group consisting of pressure and temperature.

20 Claims, 3 Drawing Sheets

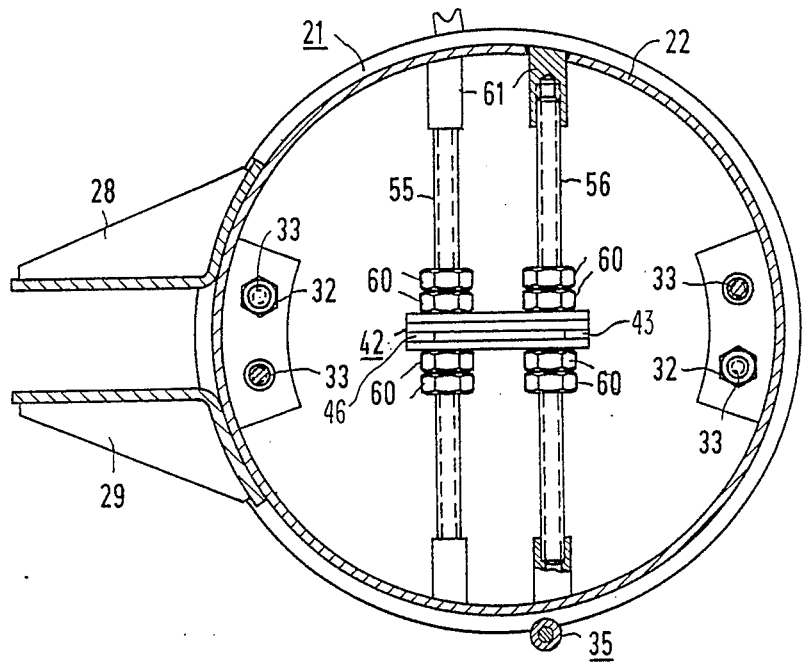
FIG 5
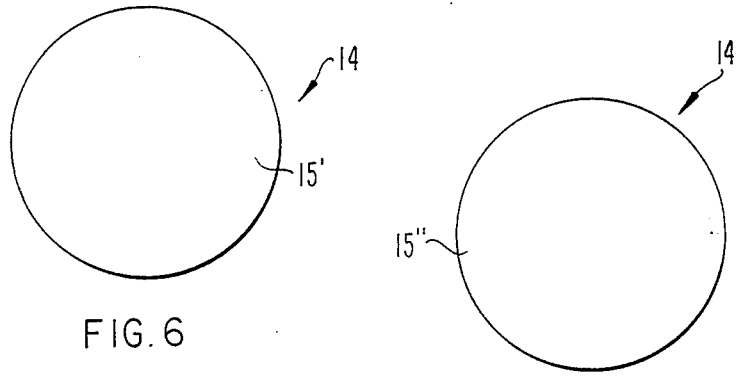
FIG. 6
FIG. 7

APPARATUS FOR THE RECOMBINATION OF HYDROGEN AND OXYGEN

SPECIFICATION

The invention relates to an apparatus for the recombination of hydrogen and oxygen with the aid of a catalyst.

As described in German Pat. DE-PS No. 30 04 677, such an apparatus is used in particular for the breakdown of the hydrogen trapped in the containment of a water-cooled nuclear reactor plant. In the device disclosed in that patent, ignition sources, which may be of a catalytic nature, are distributed in the containment. The hydrogen that might be produced during a malfunction is intended to be burned off with the ignition sources upon attainment of the lower ignition limit. The term "burning off" is intended to refer to an open combustion.

In German Pat. DE-PS No. 30 04 677, burning off is said to be unobjectionable, because gas cloud temperatures of a maximum of 500° C. that are briefly produced cannot cause any damage. However, this process is quite expensive and does not limit combustion to the vicinity of the catalyst body.

It is accordingly an object of the invention to provide an apparatus for the recombination of hydrogen and oxygen, which overcomes the hereinafter-mentioned disadvantages of the heretofore-known devices of this general type and which recombines hydrogen and oxygen with the aid of a catalyst in an apparatus in which free gas clouds are avoided.

With the foregoing and other objects in view there is provided, in accordance with the invention, an apparatus for the recombination of hydrogen and oxygen with the aid of a catalyst, comprising a vertically extending tube having end surfaces, a catalyst body disposed in the tube, and stoppers closing the end surfaces of the tube including means for opening the stoppers as a function of at least one parameter from the group consisting of pressure and/or temperature.

In the apparatus according to the invention, a recombination already takes place in the range of non-ignitable concentrations of hydrogen with the aid of the catalyst body which contains palladium or platinum as a catalyst material. In this recombination, known as "cold ignition", although heating does occur, it is substantially less extensive than in the conventional burning off process. Above all, with low hydrogen proportions, the recombination is limited in its heating to the vicinity of the catalyst body which is virtually shielded from the outside by the tube. In accordance with another feature of the invention, the tube has an inner wall surface, and the catalyst body is a spaced apart from the inner wall surface. Nevertheless, the heating assures the stimulation of a gas flow, which carries further gas through the tube and through the catalyst body, as long as the gas contains low percentages of hydrogen.

German Pat. DE-PS No. 30 35 103 does disclose the provision of shafts having recombination devices for hydrogen and oxygen in the containment of a nuclear power plant, and heating devices in the shafts which set a gas flow into motion by a chimney effect. However, these shafts, which may also include shutoff devices, are supported to extend over at least one-half the height of the containment, in other words 20 meters or more. In the shafts, electric heaters should attain temperatures of over 600° C. with approximately 50 kW of power, in order to combust existing hydrogen. On the other hand, an apparatus according to the invention which does not need to be supplied with energy and which has tube lengths of no more than 2 meters, is so small and so simple to install that it can be favorably used virtually anywhere, and above all for retrofitting purposes.

In accordance with a further feature of the invention, there is provided catalyst material coating the inner wall surface. This is done in order to improve the catalyst action. The resultant heating that then occurs there is low in comparison with the cooling surface area of the tube.

In accordance with an added feature of the invention, there is provided a porous substance containing silver nitrate being disposed below the catalyst body. Due to this provision, it is possible to keep the effectiveness of the catalyst from being affected by air-borne catalyst poisons.

In accordance with an additional feature of the invention, the porous substance containing silver nitrate is a ceramic body. This is done, for example, by being dipped in a silver nitrate solution.

In accordance with yet another feature of the invention, there are provided wires enveloped by catalyst material being secured to the catalyst body and protruding into a free space below the catalyst body in the tube.

In accordance with yet a further feature of the invention, the wires extend through the porous substance. The wires, which may extend through the porous substance having silver nitrate, are in turn heated by the heating of the catalyst body. The free ends of the wires therefore form an ignition source, with which the gas is combusted whenever the concentration of approximately 4% of hydrogen, which is sufficient for an ignition, is attained. The combustion occurs before the gas passes through the catalyst body. In contrast to the prior art apparatus, the tube provides shielding for combustion purposes as well, so that large buffers are not required.

In accordance with yet an added feature of the invention, the catalyst body has a honeycomb structure and is coated with catalyst material. The honeycomb body may be formed of a metal or ceramic carrier material, which is manufactured in cubic or cylindrical form. The channels extending parallel to the tube axis in the interior of the body are coated with palladium or platinum in a conventional manner.

In accordance with yet a further feature of the invention, the catalyst body includes wire meshes being stacked on one another in axial direction of the tube and having individual wires intersecting each other at given points, and there are provided other wires woven into the meshes at the given points and extending in axial direction of the tube. The wire meshes may be coated with the catalyst material, for example by electrodeposition, either before or after they are joined together.

In accordance with yet an added feature of the invention, the catalyst body is a metal sheet carrying the catalyst material, the metal sheet has at least one folded over edge region, and at least one of the wires is in thermally conductive contact with the metal sheet in the folded over edge region. This permits the dimensions of the overall apparatus to be reduced because it has been unexpectedly found that at the low hydrogen concentrations to be processed, even flat metal sheets of relatively small surface area are sufficient to attain a reliable recombination. The recombination causes a heat buildup to be generated so that a forceful gas flow is thermally set into motion. The rapid heating, which can lead to temperatures of 800° C., becomes greater as the carrier mass to be heated by the reaction becomes smaller. Therefore the chimney effect utilized to stimulate a gas flow can be attained even with relatively short tubes.

In accordance with yet an additional feature of the invention, the at least one folded over edge region of the metal sheet is in the form of two parallel folded over edge regions each being provided with one of the wires. The result then is a symmetrical embodiment, which is convenient to manufacture.

In accordance with still another feature of the invention, the metal sheet is disposed vertically, and the wire extends upward and downward beyond the metal sheet.

In accordance with still a further feature of the invention, the metal sheet has a lower edge extending at an angle and tapering to a runoff point, from which water produced in the recombination can drip off without impeding the wires.

In view of the high temperatures of up to 800° C., in accordance with still an added feature of the invention, the folded over edge region is fixed by a metallurgical bond, preferably produced by spot welding. This metallurgical bond can also improve the transmission of heat between the sheet and the wires.

The stoppers at the ends of the tube assure that the catalyst action is not diminished by the ambient atmosphere before a recombination is necessary. To this end, in accordance with still an additional feature of the invention, the stoppers are membranes formed of a plastic that melts at temperatures above a given level. If an elevated temperature arises, the stoppers liberate the catalyst material during a malfunction in which hydrogen is produced. Another possibility is for membranes to be ruptured by the overpressure produced during a malfunction.

In accordance with again another feature of the invention, the stoppers are bimetallic sheets. The deformation produced by changes in temperature is utilized in this case to open flow cross sections.

In accordance with again a further feature of the invention, the sheets are a multiplicity of sheet-metal strips covering the cross section of the tube. In this way, a large cross section can be exposed, even at slight temperature changes.

In accordance with again an added feature of the invention, the catalyst body is a metal sheet seated in the tube, the stoppers are caps covering the end surfaces of the tube, and there are provided means for subjecting the caps to spring biasing in an opening direction, and a bond with solder absorbing the spring biasing. With this structure, temperature-dependent opening of the tube is obtained, so that the catalyst becomes effective in the case of a malfunction. Prior to opening, the tube is protected against becoming soiled and the like.

In accordance with a concomitant feature of the invention, there is provided a bar transverse to the axial direction of the tube, the metal sheet being secured in the middle of the tube on the bar. With this fastening structure, only a limited dissipation of heat is obtained, so that the desired high temperature of the metal sheet is not impaired. However, it is also possible to select other fastenings, for instance a suspension, which is both stable and at the same time is not very thermally conductive.

Other features which are considered as characteristics for the invention are set forth in the appended claims.

Although the invention is illustrated and described herein as embodied in an apparatus for the recombination of hydrogen and oxygen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 5 is a horizontal-sectional view of the apparatus shown in FIG. 4; and

FIGS. 6 and 7 are top-plan views of other embodiments of a stopper of the apparatus.

Figure 1:
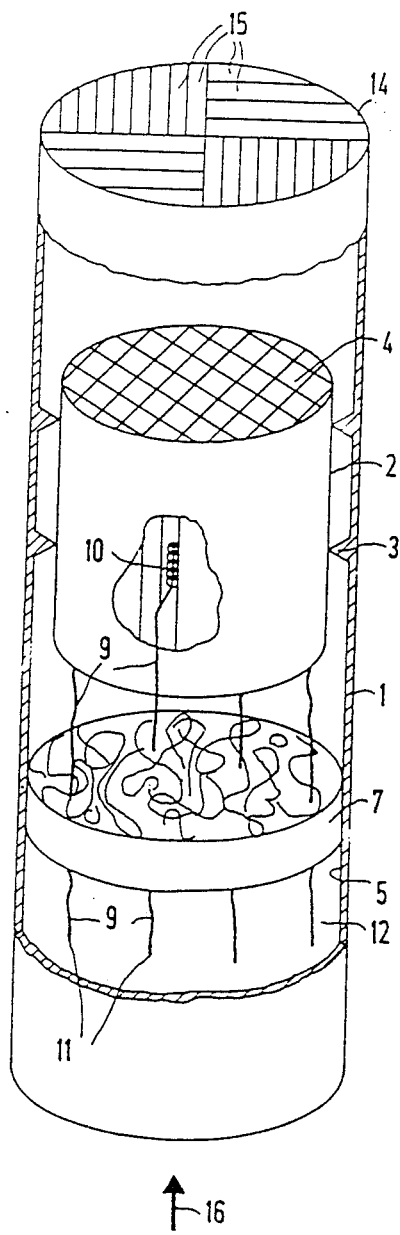
FIG. 1 is a partly broken away and sectional, diagrammatic perspective view of an apparatus according to the invention.

Referring now to the figures of the drawing in detail and first, particularly, to FIG. 1 thereof, there is seen an apparatus according to the invention including a vertically extending metal tube 1, for instance a steel tube, having a diameter of 200 mm and a length of 600 mm. The length and diameter are accordingly at a ratio of 3:1. The wall thickness is approximately 3 mm.

A catalyst body 2 which is disposed in the upper portion of the tube 1, has a diameter that is approximately 30 mm smaller than the inside diameter of the tube 1. The length of the catalyst body 2 is 150 mm. The catalyst body 2 is fixed in position by protrusions 3 of the inner wall of the tube, which assure that the transmission of heat between the catalyst body 2 and the tube 1 is as low as possible. The protrusions may be punctiform or formed of points and can be produced from outside by indenting the tube.

The catalyst body 2 in the embodiment of FIG. 1 is formed of a ceramic material having a honeycomb structure, producing a great number of channels 4 extending parallel to the tube axis and having a square cross section in the illustrated embodiment. However, the channel cross section could also be triangular, hexagonal or round, as long as a large surface area in proportion to the volume is attained. The catalyst body is coated in the vicinity of the channels 4 as well as on the outer surface thereof with palladium and/or platinum as a catalyst material. This coating is also applied to the inner surface 5 of the tube 1.

A porous substance in the form of a ceramic body 7 is provided below the catalyst body 2 and fills the tube cross section, but is only 30 mm high. The body 7 serves to chemically neutralize catalyst poisons and is provided with silver nitrate. Instead of the ceramic body 7, a compressed fiber structure, for example in the form of steel wool or asbestos cloth, could be used. The important factor is that the flow resistance be relatively low.

A broken-away portion of the catalyst body 2 shows that a wire 9, which is partly or entirely formed catalyst material, is secured to the wall of one of the channels 4. The bond between the wire 9 and the catalyst material should have good thermal conductivity at that location. The wire 9 is therefore wound into a coil 10 at the fastening point. The coil 10 is joined to the catalyst material of the wall by welding, soldering, or gluing.

As the drawing shows, a plurality of wires 9 distributed over the tube cross section protrude downward through the porous substance 7 into a free space 12. In this space, free ends 11 of the wires can function as ignition sources, which ignite inflowing hydrogen whenever the hydrogen concentration is greater than 4%. Before that occurs, catalytic recombinations in the vicinity of the catalyst body 2 bring about heating of the catalyst body itself and of the wire coils 10 that are bonded to the catalyst body in a thermally conductive manner.

Stoppers 14 which open as a function of temperature are provided on the end surfaces of the tube 1, as shown at the top of FIG. 1. In the illustrated embodiment, four segments of mutually parallel bimetallic strips 15 are provided, which bulge outward upon a temperature change and thus enable a gas flow, which is stimulated by the heating of gas in the tube 1. An identical stopper on the lower end surface is not visible. The stoppers 14 may also be formed of a plastic membrane 15' which melts above a given temperature, as shown in FIG. 6, or they may be formed of a tear membrane 15" which tears when a given pressure is reached, as shown in FIG. 7.

The novel apparatus functions entirely without external energy sources. It requires no maintenance and can therefore be used at arbitrary locations inside the containment of a water-cooled nuclear reactor, in particular a pressurized water reactor. In the event of a malfunction, the resultant elevated pressures and temperatures open the stoppers 14 of the tube 1. During this process, the medium in the containment gains access to the interior of the tube. In the vicinity of the catalyst body 2, hydrogen present in this medium is catalytically recombined with the oxygen that is also present to form water. In this exothermic reaction, the catalytic body is heated. This sets a gas flow into motion, which leads from below through the vertically extending tube in the direction indicated by an arrow 16. New medium having a hydrogen content which is reduced by recombination, is thus delivered to the catalyst body 2.

If the hydrogen content exceeds the ignition limit of 4%, then the wires 9 which are heated with the catalyst body 2 cause an ignition, so that only uncombusted hydrogen needs to be recombined in the vicinity of the catalyst body itself. The tube 1 assures that the aforementioned combustion as well as the catalytic heating take place in a shielded space and do not lead to uncontrolled consequences.

Figure 2:
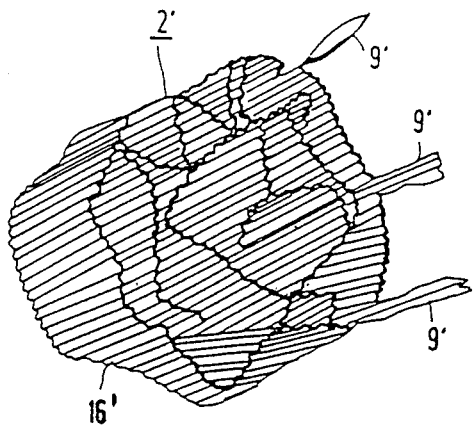
FIG. 2 is a fragmentary, perspective view of another embodiment of the catalyst body.

In the embodiment illustrated in FIG. 2, a catalyst body 2' is in the form of a coil formed of a sheet-metal strip 16', which is profiled with longitudinal beads in the direction of the axis of the coil, as the drawing shows. The sheet-metal winding of the body 2' is provided with catalyst material. The catalyst material also extends to the protrusions of the coil which function as ignition wires 9'.

Figure 3:
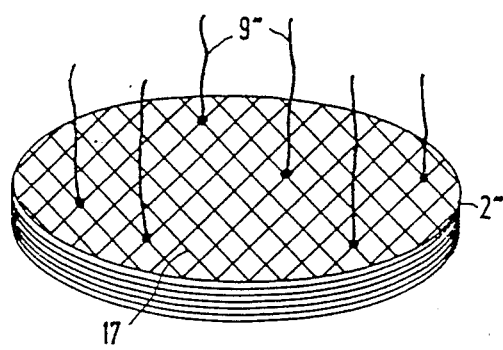
FIG. 3 is perspective view of a third embodiment of the catalyst body.

In the embodiment illustrated in FIG. 3, a catalyst body 2" is formed of stacked wire meshes 17 having the circular cross section shown in the drawing. Ignition wires 9" extending transversely to the plane of the meshes are woven into the wire meshes. The meshes 17 and ignition wires 9" can be coated in common with catalyst material.

Figure 4:
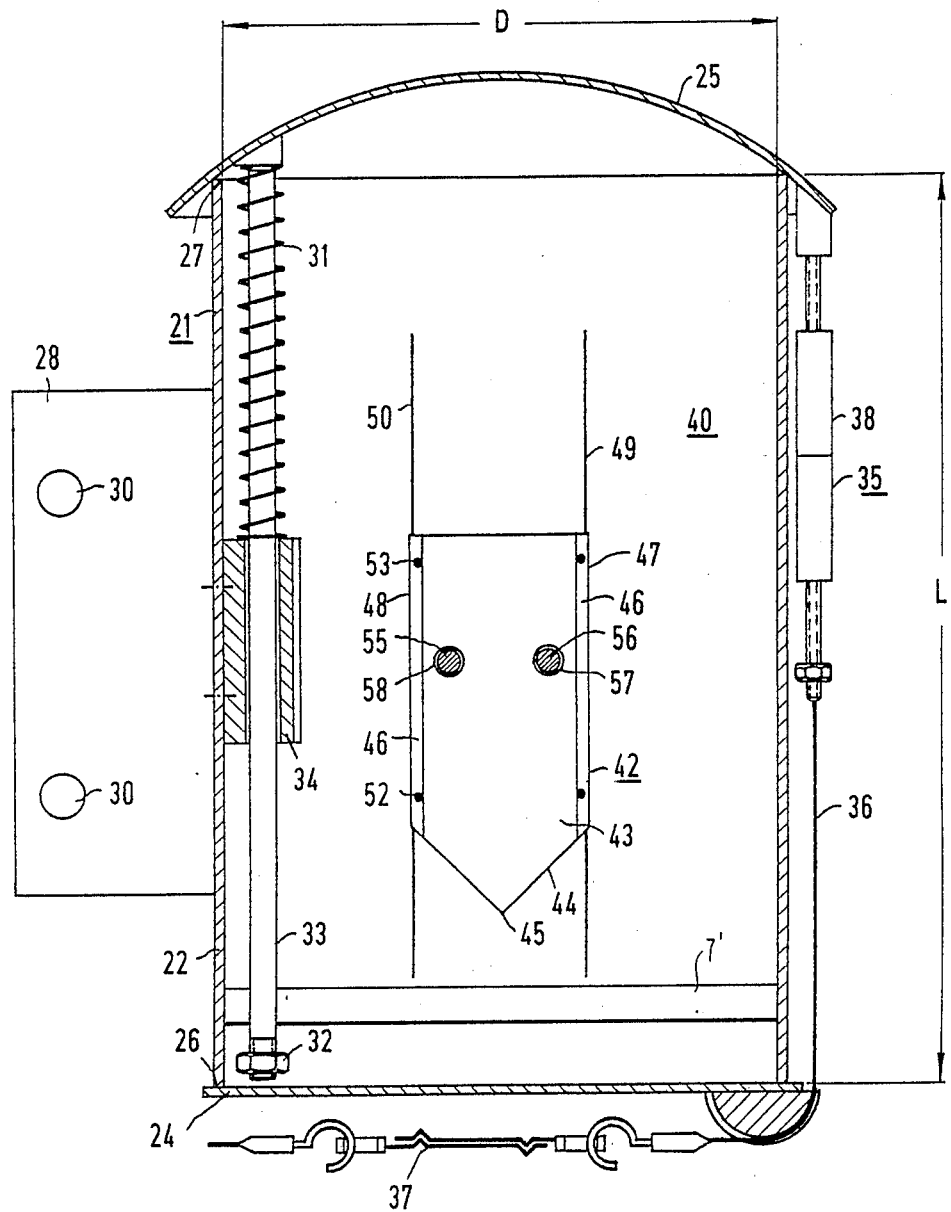
FIG. 4 is a vertical-sectional view of a further apparatus according to the invention.

The apparatus according to the invention shown in FIGS. 4 and 5 includes a housing 21 which is formed of a steel tube 22 having a diameter D of 100 mm, for example, and a length L of 180 mm, for example, and also includes caps 24 and 25 on both end surfaces 26 and 27. Two fastening brackets 28 and 29 having screw holes 30, are secured to the left side of the housing 21. The housing 21 may be secured with the fastening brackets to a core pad or carrier in the interior of the containment of a water-cooled nuclear reactor.

The bottom cap 24 and the top cap 25 are under the influence of springs 31, which tend to spread them apart and thus away from the end surfaces 26, 27. The magnitude of the motion is limited by a nut 32 on a bolt 33 supporting the spring 31. In FIG. 4, only one spring 31 acting upon the cap 25 is shown, while the springs 31 acting upon the cap 24 are mounted underneath a guide 34, but are otherwise identically constructed.

The spring force is counteracted by bracing means 35, which surround a wire 36 having a solder fuse 37. The solder fuse 37 has a response temperature of 70° C., for example. If the bracing means, which are adjustable with a lock 38, should lossen, then the interior 40 of the tube is exposed and allowed to communicate with the ambient air.

A catalyst 42 is disposed in the middle of the tube cross section, as shown in FIG. 4. The catalyst 42 includes a vertically extending flat metal sheet 43 of largely rectangular cross section, which is 40 mm in width and approximately 75 mm in length and is bordered by two spacers as shown in FIG. 5. The lower edge 44 of the flat metal sheet 43 tapers to a point 45, the angle of the edges being 45°. A porous substance in the form of a ceramic body 7' is disposed below the catalyst 42.

The metal sheet 43 is formed of stainless steel which is used as a catalyst carrier and is coated with platinum. Parallel edge regions 47 and 48 of the metal sheet 43 are folded over into folded regions 46 with a width of a few millimeters. Platinum wires 49 and 50 in the folded regions 46 protrude upward and downward out of the metal sheet 43 by approximately 40 mm each. The folded regions 46 are fixed by spot welding at least at two points 52 and 53 in the lower and upper regions of the metal sheet 43, producing a highly thermally conductive bond of the wires 49 and 50 to the metal sheet 43. As can be seen, the metal sheet 43 is secured with two bars 55 and 56 which extend transverse to the tube axis through bores 57 and 58 in the metal sheet 43. The metal sheet 43 is firmly clamped at the bores with nuts 60, which are disposed in pairs and thus checked. The bars 55, 56 are seated in threaded bushes 61 that are welded onto the tube 22.

We claim:

1. Apparatus for the recombination of hydrogen and oxygen with the aid of a catalyst, comprising a vertically extending tube having end surfaces, a catalyst body disposed in said tube, and stoppers closing said end surfaces of said tube including means for opening said stoppers as a function of at least one parameter from the group consisting of pressure and temperature.

2. Apparatus according to claim 1, wherein said tube has an inner wall surface, and said catalyst body is spaced apart from said inner wall surface.

3. Apparatus according to claim 2, including catalyst material coating said inner wall surface.

4. Apparatus according to claim 1, including a porous substance containing silver nitrate being disposed below said catalyst body.

5. Apparatus according to claim 4, wherein said porous substance containing silver nitrate is a ceramic body.

6. Apparatus according to claim 4, including wires enveloped by catalyst material being secured to said catalyst body and protruding into a free space below said catalyst body in said tube.

7. Apparatus according to claim 6, wherein said wires extend through said porous substance.

8. Apparatus according to claim 1, wherein said catalyst body has a honeycomb structure and is coated with catalyst material.

9. Apparatus according to claim 1, wherein said catalyst body includes wire meshes being stacked on one another in axial direction of said tube and having individual wires intersecting each other at given points, and including other wires woven into said meshes at said given points and extending in axial direction of said tube.

10. Apparatus according to claim 1, wherein said stoppers, are membranes formed of a plastic that melts at temperatures above a given level.

11. Apparatus according to claim 1, wherein said stoppers are bimetallic sheets.

12. Apparatus according to claim 11, wherein said sheets are a multiplicity of sheet-metal strips covering the cross section of said tube.

13. Apparatus according to claim 1, wherein said catalyst body is a metal sheet seated in said tube, said stoppers are caps covering said end surfaces of said tube, and including means for subjecting said caps to spring biasing in an opening direction, and a bond with solder absorbing said spring biasing.

14. Apparatus for the recombination of hydrogen and oxygen with the aid of a catalyst, comprising a vertically extending tube having end surfaces, a catalyst body disposed in said tube, stoppers closing said end surfaces of said tube including means for opening said stoppers as a function of at least one parameter from the group consisting of pressure and temperature, and wires enveloped by catalyst material being secured to said catalyst body and protruding into a free space below said catalyst body in said tube, said catalyst body being a metal sheet carrying said catalyst material, said metal sheet having at least one folded over edge region, and at least one of said wires being in thermally conductive contact with said metal sheet in said folded over edge region.

15. Apparatus according to claim 14, including a bar transverse to the axial direction of said tube, said metal sheet being secured in the middle of the tube on said bar.

16. Apparatus according to claim 14, wherein said at least one folded over edge region of said metal sheet is in the form of two parallel folded over edge regions each being provided with one of said wires.

17. Apparatus according to claim 14, wherein said metal sheet is disposed veritically, and said wire extends upward and downward beyond said metal sheet.

18. Apparatus according to claim 17, wherein said metal sheet has a lower edge extending at an angle and tapering to a runoff point.

19. Apparatus according to claim 14, wherein said folded over edge region is fixed by a metallurgical bond.

20. Apparatus according to claim 14, including a porous substance containing silver nitrate being disposed below said catalyst body.

* * * * *